(12) United States Patent
Ehrne

(10) Patent No.: US 9,086,172 B2
(45) Date of Patent: Jul. 21, 2015

(54) VACUUM VALVE

(71) Applicant: VAT Holding AG, Haag (CH)

(72) Inventor: Florian Ehrne, Frumsen (CH)

(73) Assignee: VAT Holding AG, Haag (CH)

( * ) Notice: Subject to any disclaimer, the term of this patent is extended or adjusted under 35 U.S.C. 154(b) by 112 days.

(21) Appl. No.: 13/940,369

(22) Filed: Jul. 12, 2013

(65) Prior Publication Data

US 2014/0021395 A1  Jan. 23, 2014

(51) Int. Cl.
*F16K 3/18* (2006.01)
*F16K 3/316* (2006.01)
*F16K 51/02* (2006.01)

(52) U.S. Cl.
CPC ............... *F16K 51/02* (2013.01); *F16K 3/184* (2013.01); *F16K 3/186* (2013.01); *F16K 3/3165* (2013.01)

(58) Field of Classification Search
CPC ....... F16K 51/02; F16K 3/184; F16K 3/3165; F16K 3/316; F16K 3/0254; F16K 3/0272; F16K 3/029; F16K 3/186
USPC ......... 251/326, 327, 193, 195, 196, 197, 199, 251/229, 291, 366, 367, 62
See application file for complete search history.

(56) References Cited

U.S. PATENT DOCUMENTS

| | | | |
|---|---|---|---|
| 1,907,083 A | | 5/1933 | Myercord et al. |
| 3,771,275 A | | 11/1973 | Seckerson |
| 5,032,034 A | | 7/1991 | Bischof et al. |
| 6,299,133 B2 | * | 10/2001 | Waragai et al. ............... 251/193 |
| 6,347,918 B1 | * | 2/2002 | Blahnik ........................ 414/217 |
| 6,561,484 B2 | | 5/2003 | Nakagawa et al. |
| 6,899,316 B2 | | 5/2005 | Duelli |
| 2004/0079915 A1 | | 4/2004 | Contin et al. |
| 2006/0225811 A1 | | 10/2006 | Sheydayi et al. |
| 2008/0066811 A1 | | 3/2008 | Duelli |
| 2011/0095218 A1 | | 4/2011 | Schoch et al. |

FOREIGN PATENT DOCUMENTS

| | | |
|---|---|---|
| BE | 402908 | 4/1934 |
| EP | 0306591 | 3/1989 |
| KR | 20100061214 | 6/2010 |
| WO | 2011087190 | 7/2011 |
| WO | 2011096613 | 8/2011 |
| WO | 2011137691 | 11/2011 |

OTHER PUBLICATIONS

VAT Manual dated Mar. 16, 2009, "Rectangular Gate Valve XL-VAT", pp. 1-26.

* cited by examiner

*Primary Examiner* — Marina Tietjen
*Assistant Examiner* — Michael R Reid
(74) *Attorney, Agent, or Firm* — Volpe and Koenig, P.C.

(57) ABSTRACT

A vacuum valve includes a valve housing (1) with at least one valve opening (2, 3), at least one valve plate (10, 11) and a carrying unit (9), which carries the at least one valve plate (10, 11). The at least one valve plate (10, 11) is connected to the carrying unit (9) via at least two connecting devices, each having a connecting part (45), with a neck portion (47) and an enlarged head portion (48), which projects in relation to the neck portion (47), and having a receiving part (46, 56'), with a respective receiving slot (49) into which the neck portion (47) of the connecting part (45). In order to prevent the connecting parts (45) from moving out of the receiving slots (49), at least one of the receiving parts (46') of the connecting devices can be rotated about an axis of rotation (80) from an introduction position, in which the associated connecting part (45) can be introduced into the receiving slot (49), by way of its neck portion (47), as far as the end position, into a blocking position.

15 Claims, 11 Drawing Sheets

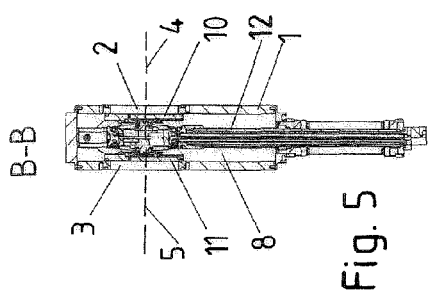
Fig. 5
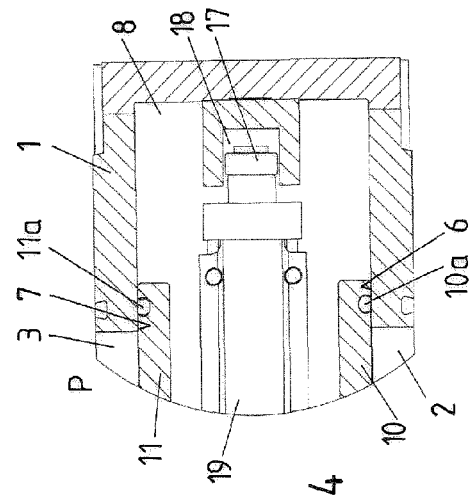
Fig. 4
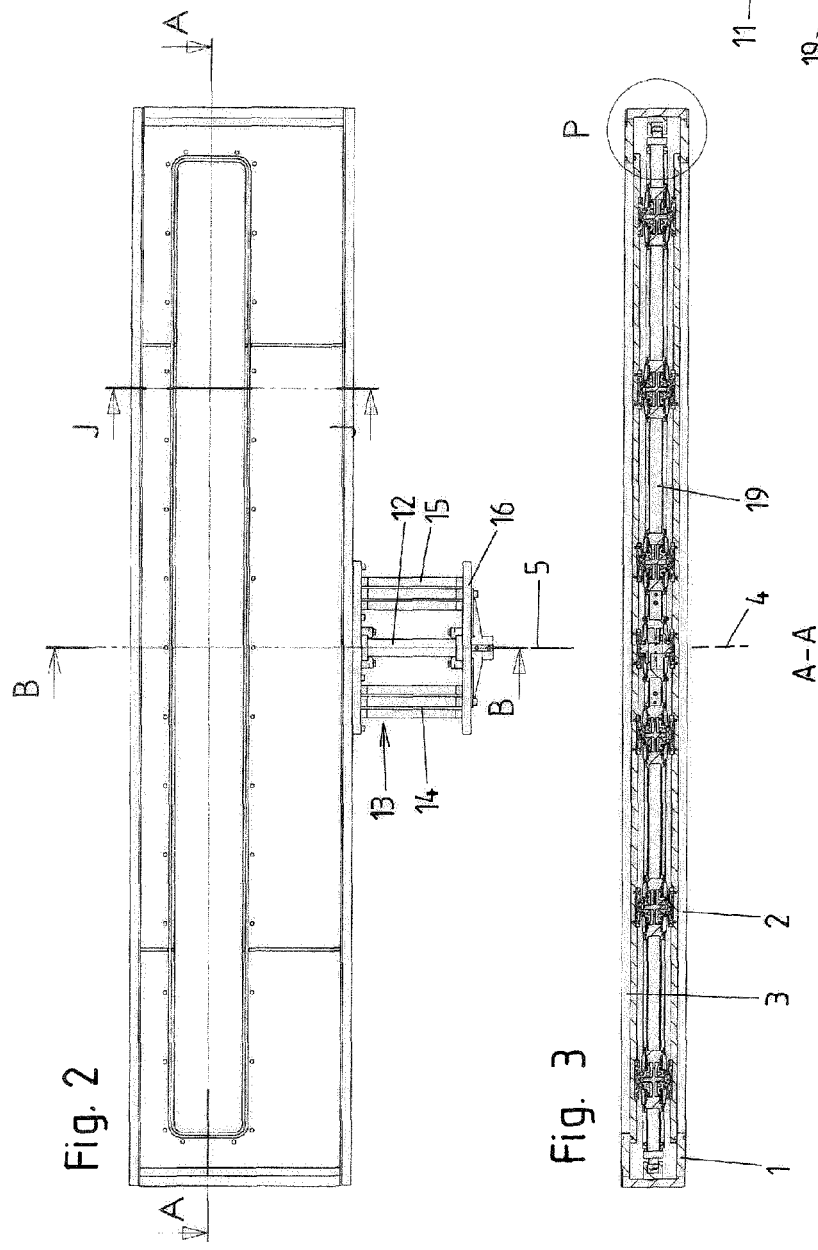
Fig. 2
Fig. 3

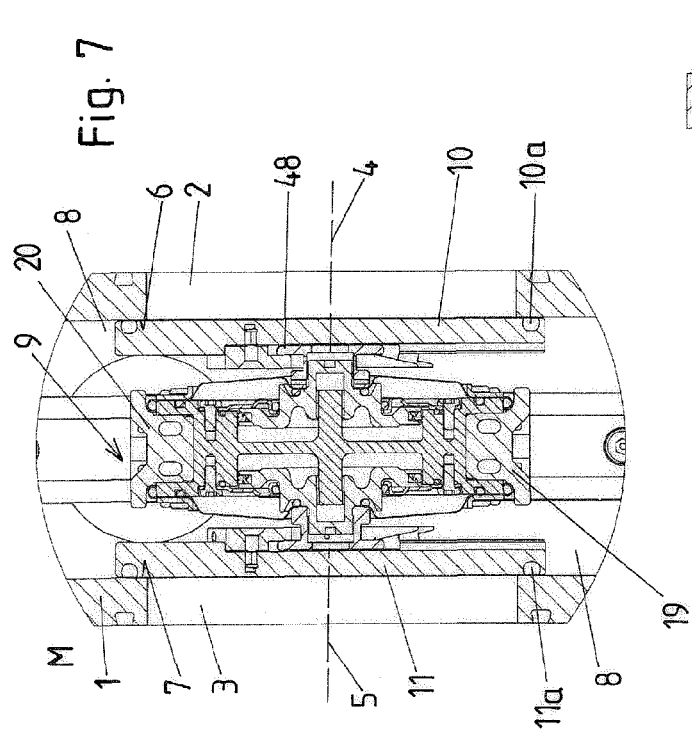
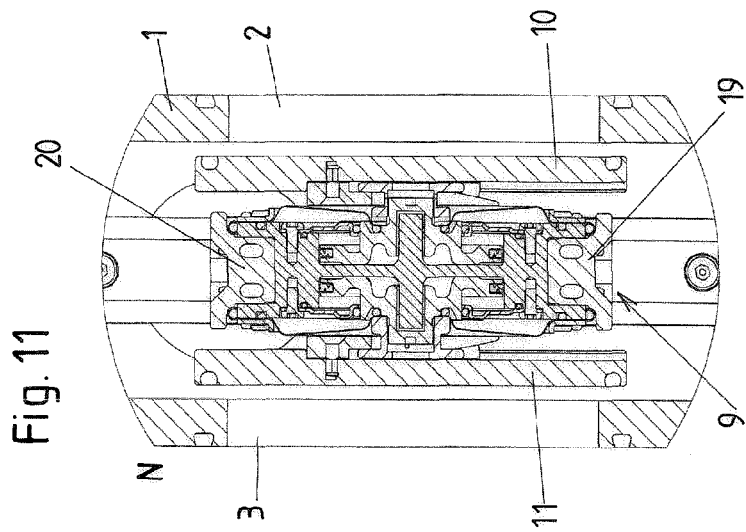
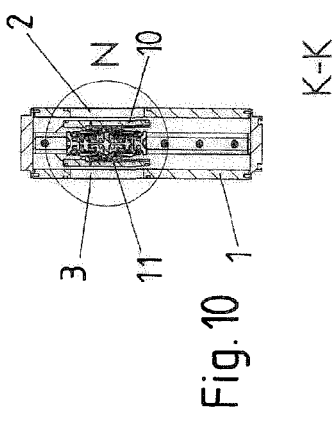
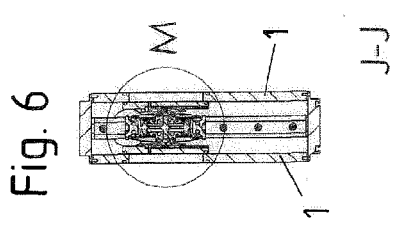

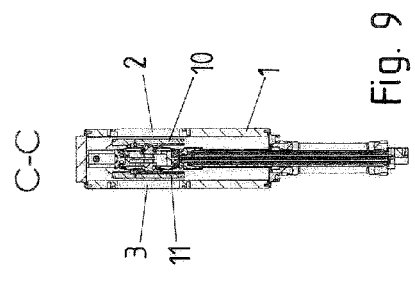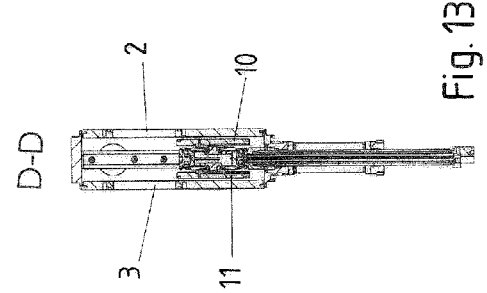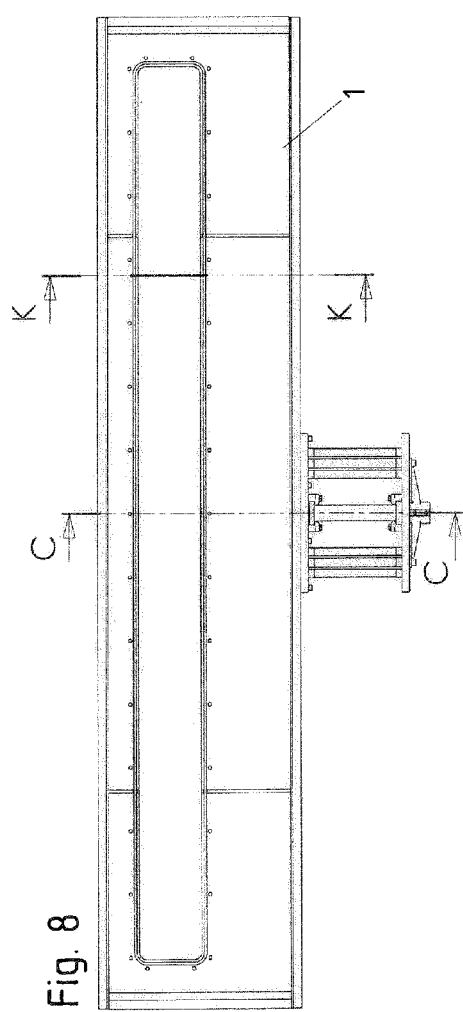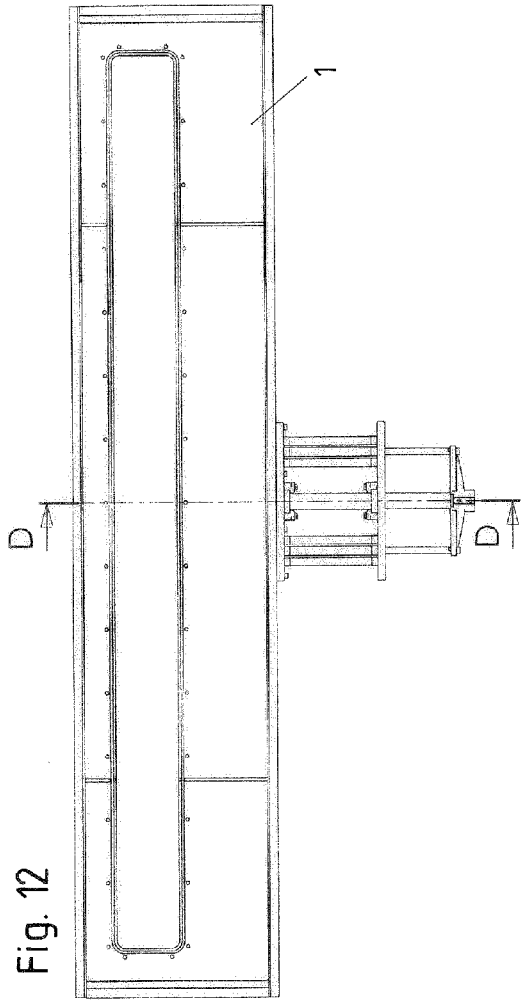

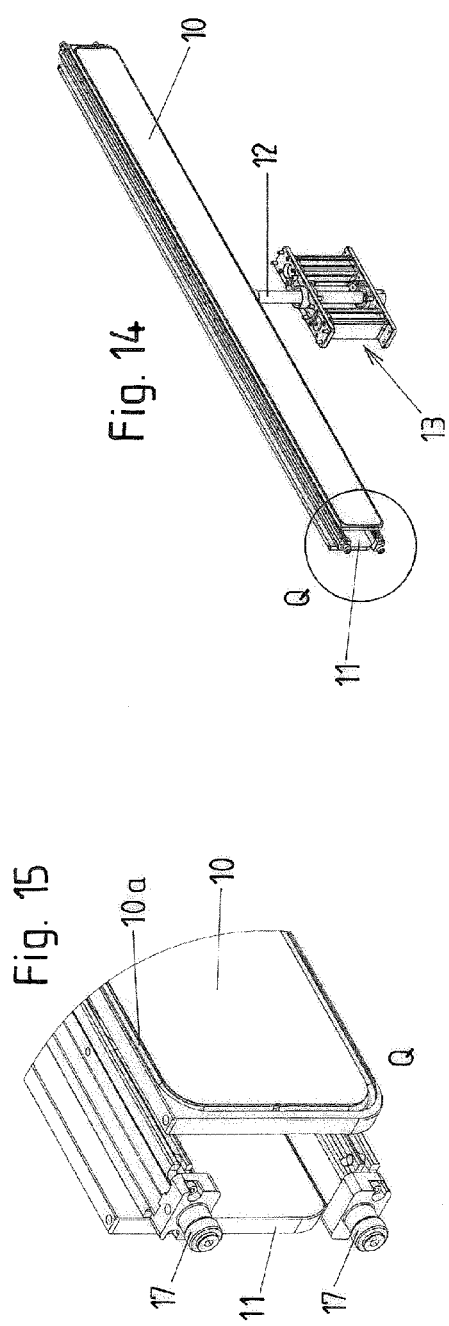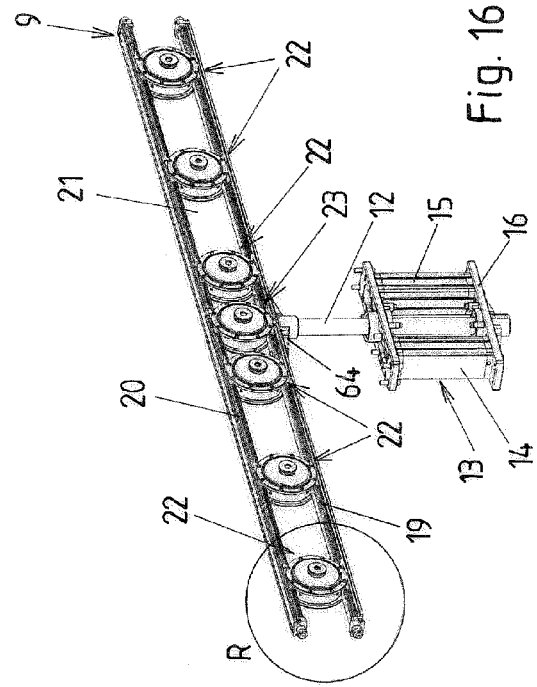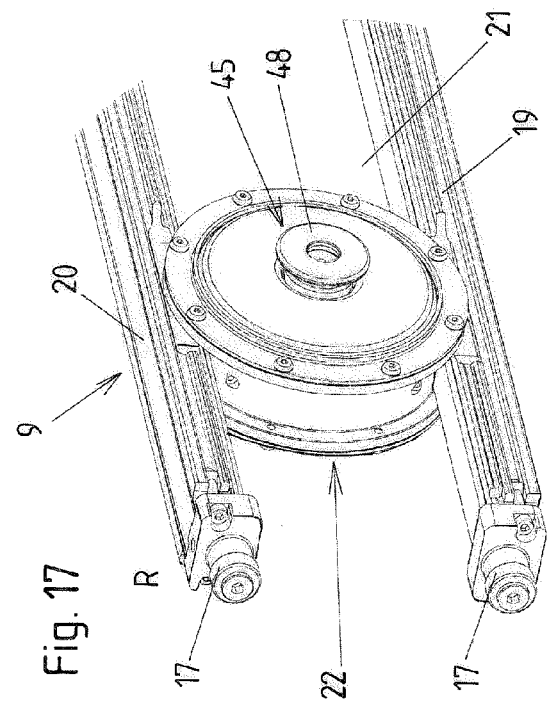

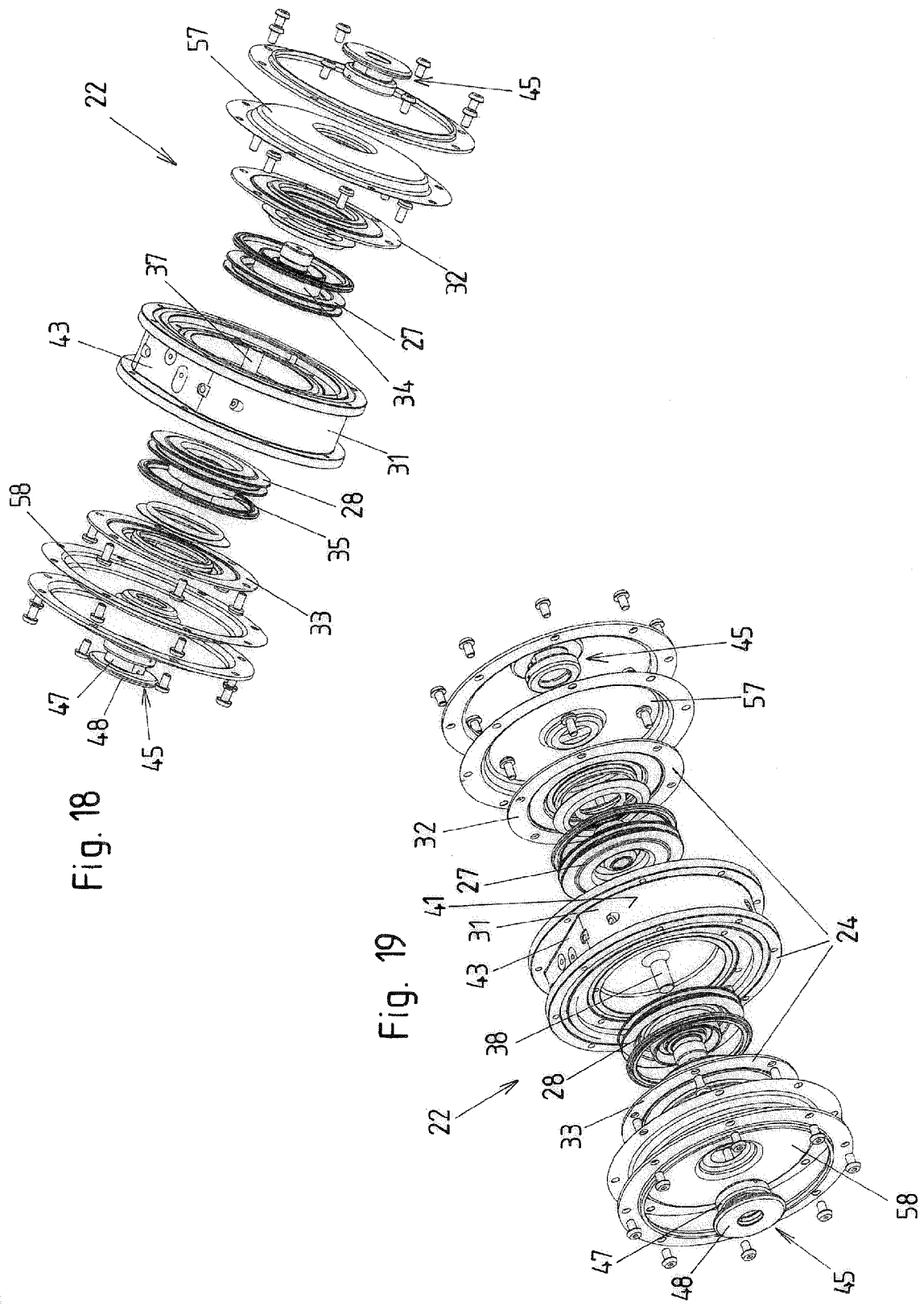

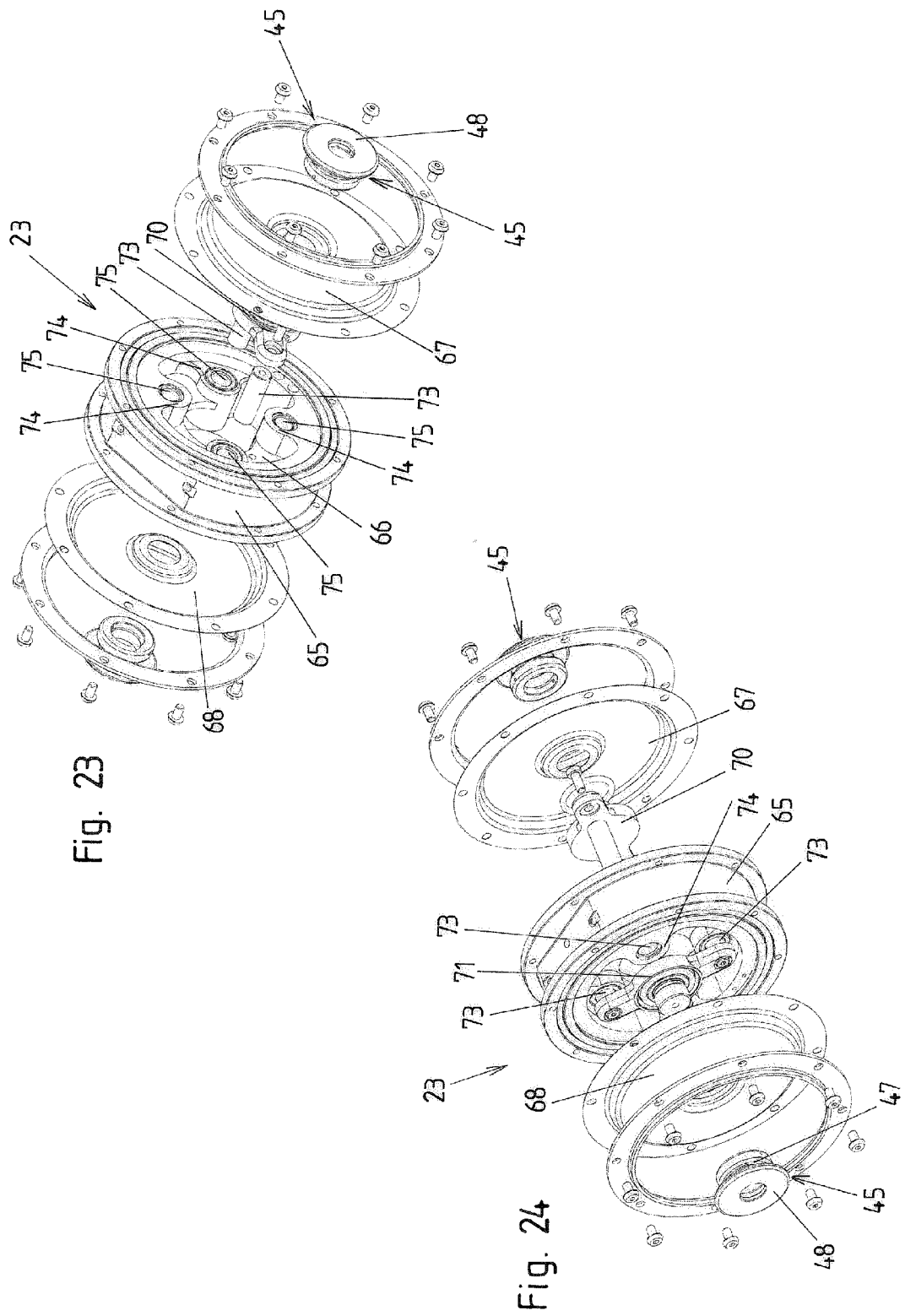

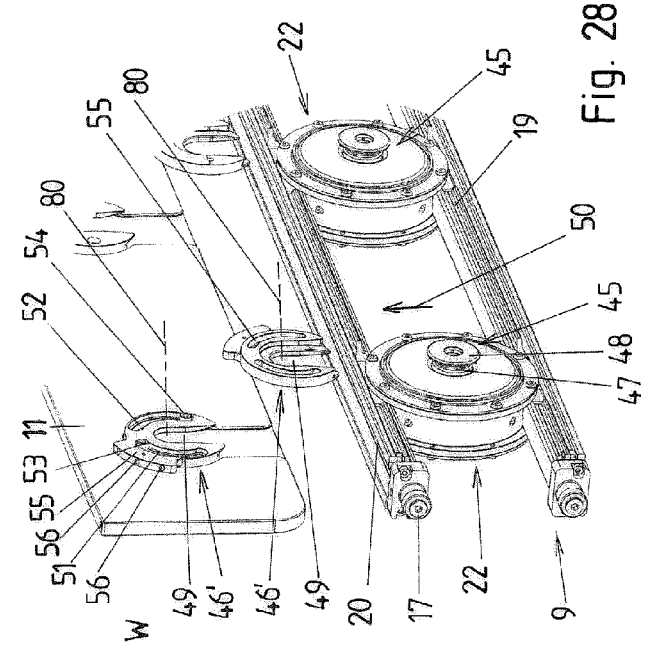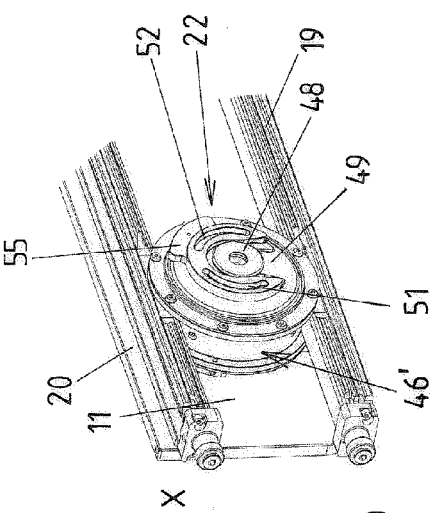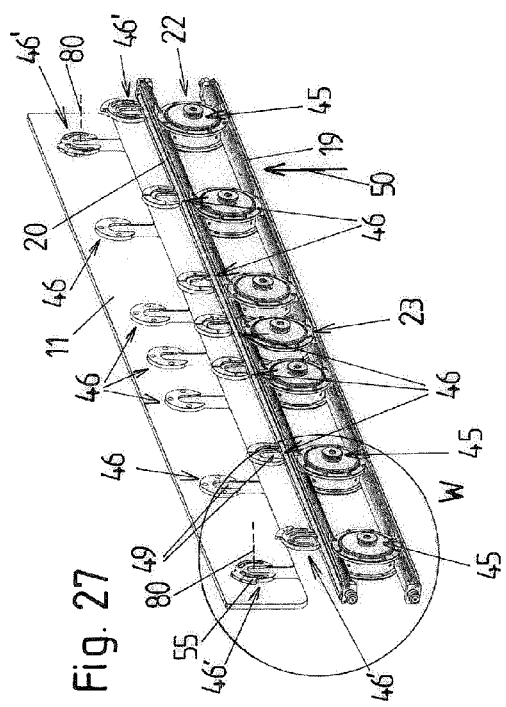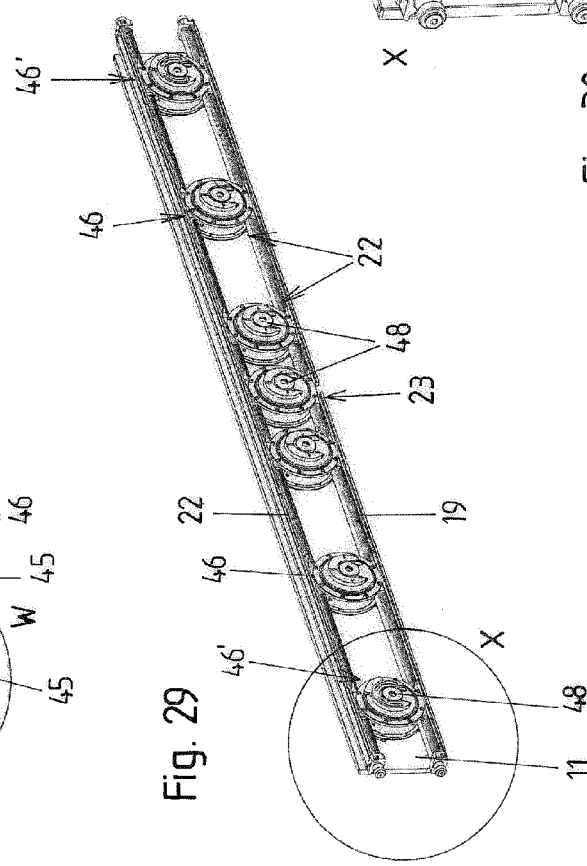

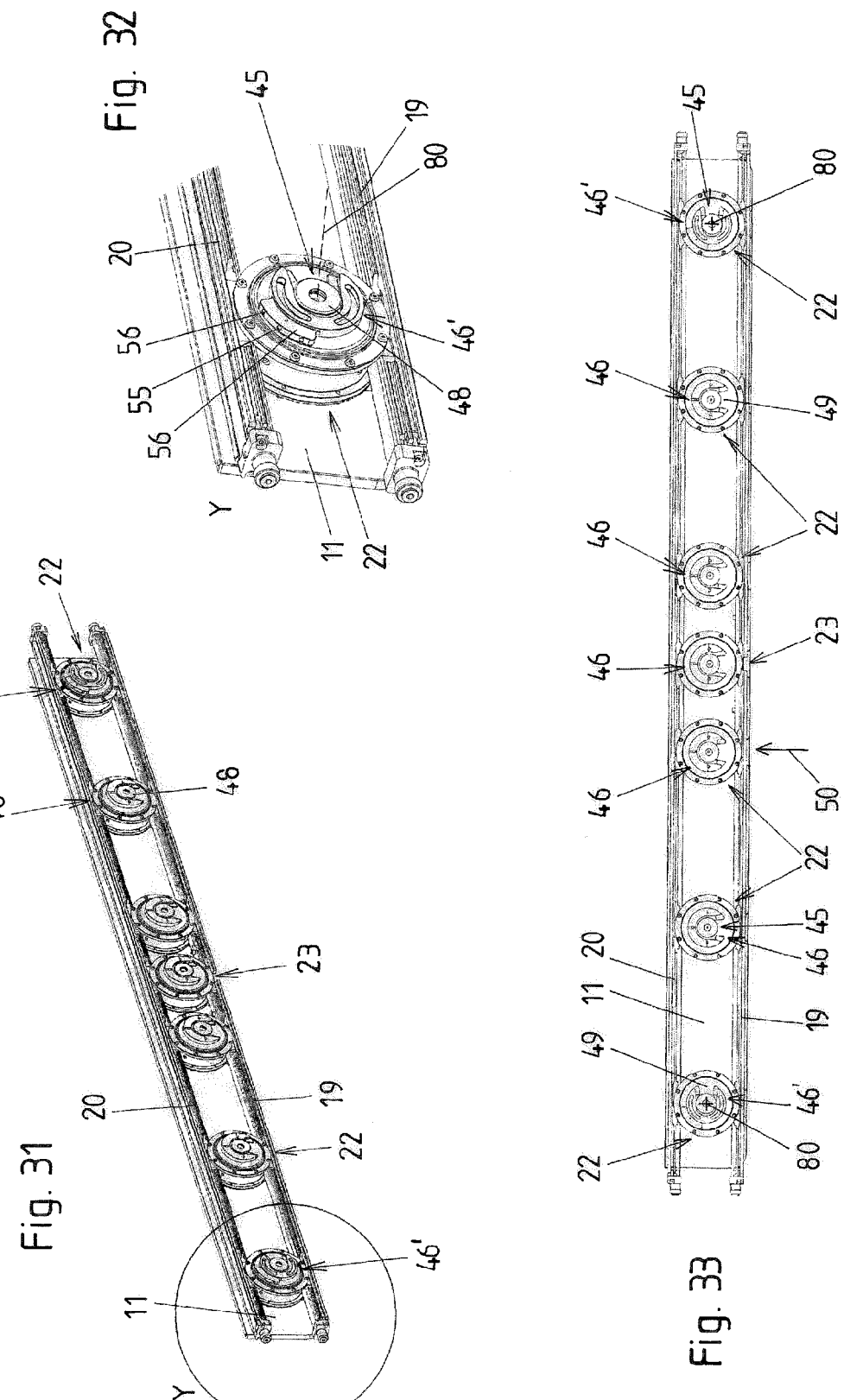

VACUUM VALVE

INCORPORATION BY REFERENCE

The following documents are incorporated herein by reference as if fully set forth: Austrian Patent Application A803/2012, filed Jul. 19, 2012.

BACKGROUND

The invention relates to a vacuum valve comprising a valve housing with at least one valve opening, which has an axis and is enclosed by a valve seat, at least one valve plate, which can be adjusted between an open position, in which the valve plate frees the valve opening, and a closed position, in which the valve plate butts against the valve seat, and a carrying unit, which carries the at least one valve plate.

WO 2011/096613 A1, KR 10-2010-0061214 and US 2006/0225811 A1 disclose vacuum valves having first and second valve plates which, in the closed state of the vacuum valve, close first and second valve openings of a valve housing. In the case of these vacuum valves, a carrying unit, which carries the valve plates, is fitted on at least one valve rod which can be displaced in the direction of its longitudinal axis. The displacement of the valve rod allows the valve plates to be adjusted between an open position, in which they free the respective valve opening, and an intermediate position, in which they cover over the respective valve opening, but are raised up from the valve seat. Piston/cylinder units, with the valve plates fitted on the piston rods thereof, are integrated in the panel-like or cube-shaped carrying unit. The piston/cylinder units allow the valve plates to be adjusted between the intermediate position and a closed position, in which they close the respective valve opening.

U.S. Pat. No. 6,899,316 B2 discloses a vacuum valve in which a carrying unit carries a single valve plate. Piston/cylinder units, with the valve plate fitted on the piston rods thereof, are integrated, as drive elements for the valve plate, in the cube-shaped carrying unit. The carrying unit is fitted on a valve rod, which can be adjusted in the direction of its longitudinal axis. A similar vacuum valve is known from common usage. In the case of the latter, the drive elements provided for the valve plate are, once again, piston/cylinder units, in this case fastened on the outside of the panel-like carrying unit. The piston rods of these piston/cylinder units have an enlarged head on the end side. These heads of the piston rods are retracted into undercut grooves provided in the valve plate. The longitudinal peripheries which delimit the respective groove on the surface of the valve plate thus form a receiving slot which allows the respective piston rod to be retracted in a piston-rod neck portion adjoining the head portion. In order to secure the heads in the grooves, use is made of fastening screws which are screwed into the piston rods through the valve plate. The valve plates are also connected to the drive elements of the carrying unit in an analogous manner in the case of the vacuum valve from KR 10/2010-0061214.

US 2004/0079915 A1 and U.S. Pat. No. 6,561,484 B2 disclose vacuum valves in which a valve plate and a supporting plate, located opposite, are carried by a carrying unit and can be adjusted in relation to the carrying unit by means of piston/cylinder units. In the closed state, the supporting plate is supported on the valve housing, in order to push the valve plate onto the valve seat.

In the case of the vacuum valve which is known from US 2008/0066811 A1, a carrying unit, on which first and second valve plates are fitted on opposite sides, is displaced by means of push rods, in order to push either the first valve plate or the second valve plate onto the valve seat. The push rods are actuated by piston/cylinder units, which are arranged on the valve housing.

US 2011/0095218 A1 discloses a vacuum valve in which first and second valve plates are fastened in a non-movable manner on a carrying unit. The carrying unit is adjusted by means of a valve rod in order for each of the valve plates to be pushed alternately onto one of the valve seats. The valve plates are pushed onto the carrying unit via guides, wherein a protrusion of the carrying unit engages in an undercut groove of the respective valve plate.

SUMMARY

It is an object of the invention to provide an advantageous vacuum valve of the type mentioned in the introduction in the case of which straightforward installation and removal of the at least one valve plate is made possible. This is achieved with a vacuum valve having one or more features according to the invention.

In the case of the vacuum valve according to the invention, at least two connecting devices, each comprising a connecting part and a receiving part, are present for connecting the valve plate, or a respective one of the valve plates, to the carrying unit. The connecting part has a neck portion and an enlarged head portion, which projects in relation to the neck portion. A respective receiving part has a receiving slot into which the neck portion of the connecting part can be introduced. The slot width of the receiving slot is smaller, at least in the region in which the connecting part is located in its end position, preferably over the entire longitudinal extent of the receiving slot, than the diameter of the head portion of the connecting part, as measured in the direction of the width extent of the receiving slot, and therefore the connecting part located in its end position cannot be pulled out of the receiving slot at right angles to the longitudinal extent of the receiving slot. In order to prevent the situation where the connecting parts introduced into the receiving slots as far as their end positions can move out of the receiving slots again, at least one of the receiving parts can be rotated between an introduction position and a blocking position. In the introduction position, the neck portion of the associated connecting part can be pushed into the receiving slot as far as the end position of the connecting part. In the end position of the connecting part, the receiving part is rotated into the blocking position, preferably through 90°.

Advantageously the receiving parts of at least two connecting devices, via which the valve plate, or a respective valve plate, is connected to the carrying unit, can be rotated about an axis of rotation between an introduction position and a blocking position, wherein the axes of rotation are located parallel to one another.

Introduction of the respective connecting part into the receiving slot takes place from the location at which the connecting part passes into the receiving slot as far as the end position of the connecting part, in an introduction direction oriented in the longitudinal direction of the receiving slot. Preferably a respective receiving part is pushed into the receiving slot, in the introduction direction, via an open end of the respective receiving slot. However, it would also be conceivable and possible for a respective receiving slot to have a region of enlarged width into which the head portion of the associated connecting part can be introduced at right angles to the longitudinal extent of the receiving slot, whereupon the connecting part is then displaced as far as the end position in the longitudinal direction of the receiving slot (=the introduction direction).

The axis of rotation of the at least one rotatable receiving part is located, in particular, at right angles to the introduction direction and at right angles to the plane in which the valve plate, or in which a respective valve plate, is located.

The abovedescribed connection between the at least one valve plate and the carrying unit allows the valve plate to be installed straightforwardly and reliably on the carrying unit. In particular in order for servicing to be carried out, the valve plate can be straightforwardly removed, i.e. from the carrying unit.

It is preferred to fit the receiving parts of the connecting devices on the at least one valve plate, wherein at least one of the receiving parts can be rotated about the axis of rotation between the introduction position and the blocking position in relation to the valve plate, on which it is fitted directly or via at least one bearing part. Preferably at least two of the receiving parts in this form are fitted in a rotatable manner on the valve plate, or a respective valve plate. It would also be possible, in principle, for the non-rotatable receiving parts to be formed integrally with the valve plate. The connecting parts of the connecting devices are then connected, in particular rigidly connected, to the carrying unit, preferably to drive elements or guide elements of the carrying unit or are formed integrally therewith. A converse arrangement (connecting parts on the at least one valve plate; receiving parts on the carrying unit) is also conceivable and possible.

The at least one valve plate can be adjusted preferably from the open position into the closed position via an intermediate position, wherein the valve plate, or a respective one of the valve plates, in the intermediate position, covers over the valve opening, or a respective one of the valve openings, but is raised up from the valve seat, or from the respective valve seat. In order to adjust the at least one valve plate between the intermediate position and the closed position, it is advantageously provided that the carrying unit has drive elements for this purpose. Such drive elements can also perform a guidance function for guiding the at least one valve plate in its movement between the intermediate position and the closed position. In addition, the carrying unit may have at least one separate guide element which serves just for guiding the at least one valve plate. The drive elements and, if present, the at least one guide element are connected to the valve plate, or the respective valve plate, in each case via a connecting device.

The drive elements preferably each comprise a cylinder, having at least one cylinder space, and at least one piston, which is arranged in the cylinder space and has a piston rod, which is connected (directly or indirectly) to the valve plate, or one of the valve plates, via one of the connecting devices.

The at least one guide element, if present, preferably comprises a housing and at least one guide rod, which is guided in a displaceable manner by the housing and is connected (directly or indirectly) to the valve plate, or one of the valve plates, via one of the connecting devices. The guide element advantageously has a sealed interior which is delimited by the housing and by flexible membranes, which are connected in a sealed manner to the housing, on opposite sides, as seen in relation to the direction of the axis of the at least one valve opening, and in which the at least one guide rod is mounted in a displaceable manner. This sealed interior is connected to the atmosphere, or evacuated (=pumped out), via a line which opens out into it.

In an advantageous embodiment of the invention, the carrying unit has at least a first and a second carrier rod, to which the cylinders of the drive elements are rigidly connected. The cylinders here each span an interspace located between the first and the second carrier rods, wherein the first and the second carrier rods are arranged on opposite sides laterally alongside the piston rods of the drive elements.

This can give rise to an advantageous and material-saving design which can be straightforwardly adapted to different sizes of vacuum valve.

The carrying unit preferably has precisely two carrier rods, wherein the first carrier rod is arranged on one side laterally alongside the piston rods of the drive elements and the second carrier rod is arranged on the opposite side laterally alongside the piston rods of the drive elements.

If the carrying unit, in addition to the drive elements, has at least one guide element for the at least one valve plate, the housing of the guide element is advantageously likewise fastened on the first and on the second carrier rods and spans the interspace located between the first and the second carrier rods.

The at least one guide element serves to guide the at least one valve plate in a displaceable manner, or at least to assist the drive elements in this guidance, and to absorb, at least in part, the force caused by the weight of the at least one valve plate, that is to say to carry the at least one valve plate, or at least to assist the drive elements in this.

Overall, a frame structure is thus formed for the carrying unit, this structure comprising the carrier rods and the drive elements and possibly at least one guide element. In order to form carrying units of different sizes for vacuum valves of different sizes, use can be made of the same drive elements and, if present, the same guide elements, possibly, depending on the size of the carrying unit, in different numbers, and, in addition, use is made of carrier rods of corresponding length. If the carrier rods are formed by extruded profiles, as is preferred, these extruded profiles can be straightforwardly cut to the desired length. Extruded profiles have the advantage that channels running through the carrier rods can also be created during production, which allows efficient production. Overall, it is the case that carrying units for different sizes of vacuum valves with different longitudinal valve-opening extents can therefore be realized in a straightforward manner.

The first and second carrier rods are preferably located in a common plane, which is located parallel to the plane in which the valve plate, or a respective valve plate, is located.

The vacuum valve here, in one possible embodiment, has a single valve plate carried by the carrying unit. In another possible embodiment, the valve housing has first and second valve openings which have parallel axes and are enclosed in each case by a valve seat, and the carrying unit carries, on opposite sides, a first and a second valve plate, which, in their closed positions, butt against the respective valve seat and, in their open positions, free the respective valve opening. It is preferable here for a first and a second piston to be arranged in the cylinder of a respective drive element of the carrying unit, advantageously each in a dedicated cylinder space, wherein the piston rod of the first piston is connected to the first valve plate and the second piston is connected to the second valve plate. A respective one of the drive elements thus serves for adjusting the two valve plates. However, it would also be conceivable and possible for different drive elements to be present with the first and second valve plates, these drive elements each having just one piston, of which the piston rod is connected to the associated valve plate.

The at least one valve plate is preferably of rectangular form with a greater length than width, preferably with a length which is at least double, particularly preferably at least three times the size of, the width. The connecting devices for connecting the at least one valve plate to the carrying unit are spaced apart from one another in the direction of the longitudinal extent of the valve plate.

BRIEF DESCRIPTION OF THE DRAWINGS

Further advantages and details of the invention will be explained hereinbelow with reference to the accompanying drawings.

In the drawings:

FIG. 2 shows a view of the vacuum valve in the closed state, that is to say with the valve plates in the closed position;

FIG. 3 shows a section along line AA from FIG. 2;

FIG. 4 shows an enlarged detail P from FIG. 3;

FIG. 5 shows a section along line BB from FIG. 2;

FIG. 6 shows a section along line JJ from FIG. 2;

FIG. 7 shows an enlarged detail M from FIG. 6;

FIG. 8 shows a view of the vacuum valve with the valve plates in the intermediate position;

FIG. 9 shows a section along line CC from FIG. 8;

FIG. 10 shows a section along line KK from FIG. 8;

FIG. 11 shows an enlarged detail N from FIG. 10;

FIG. 12 shows a view of the vacuum valve in the open state, that is to say with the valve plates in the open position;

FIG. 13 shows a section along line DD from FIG. 12;

FIG. 14 shows a perspective view of the carrying unit with the valve plates fitted thereon and of the valve rod with the valve-rod drive;

FIG. 15 shows an enlarged detail Q from FIG. 14;

FIG. 16 shows a perspective view of the carrying unit with the valve rod and the valve-rod drive;

FIG. 17 shows an enlarged detail R from FIG. 16;

FIG. 18 shows an exploded illustration of one of the drive elements with the connecting parts of the connecting devices;

FIG. 19 shows an exploded illustration corresponding to FIG. 18, but from a different viewing angle;

FIG. 23 shows an exploded illustration of the guide element with the connecting parts and receiving parts of the connecting devices;

FIG. 24 shows an exploded illustration corresponding to FIG. 23, but from a different viewing angle;

FIG. 27 shows a perspective view of the carrying unit and of the valve plates removed from the carrying unit, wherein, of the first valve plate, located at the front, only the receiving parts fitted thereon are illustrated;

FIG. 28 shows an enlarged detail W from FIG. 27;

FIG. 29 shows a perspective view corresponding to FIG. 27, but with the valve plates pushed onto the head portions of the connecting parts by way of the receiving parts, wherein the rotatable receiving parts are located in their introduction position;

FIG. 30 shows an enlarged detail X from FIG. 29;

FIG. 31 shows an illustration corresponding to FIG. 29, although the rotatable receiving parts are located in their blocking position;

FIG. 32 shows an enlarged detail Y from FIG. 31; and

FIG. 33 shows an elevation of the parts from FIG. 31 in the same state as FIG. 31.

DETAILED DESCRIPTION OF THE PREFERRED EMBODIMENTS

Figure 1:
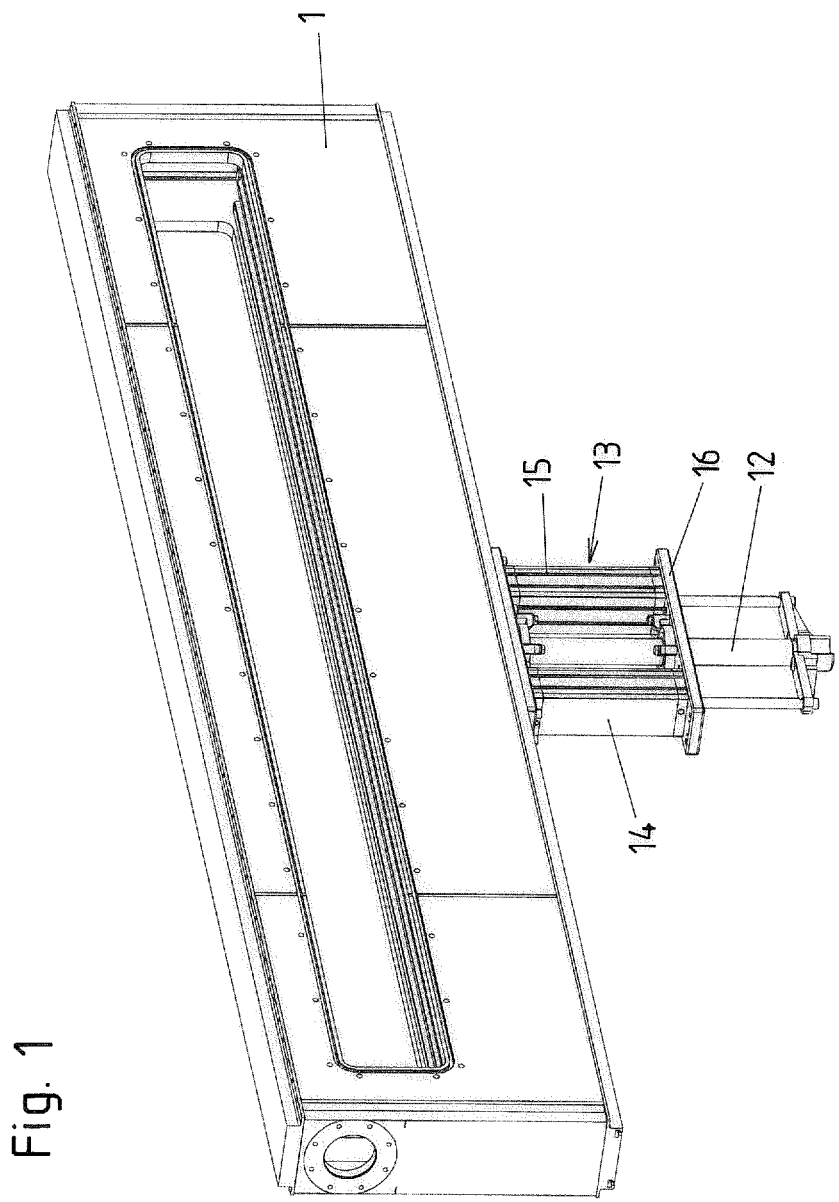
FIG. 1 shows a perspective view of an exemplary embodiment of a vacuum valve according to the invention.

The figures are shown to different scales.

An exemplary embodiment of a vacuum valve according to the invention is illustrated in the figures. The vacuum valve comprises a valve housing 1 with first and second valve openings 2, 3, which have parallel axes 4, 5. The valve openings 2, 3 are arranged in opposite walls of the valve housing 1 and are in alignment with one another. The walls having the valve openings 2, 3 have valve seats 6, 7 on their mutually facing inner sides, these valve seats enclosing the valve openings 2, 3.

The accommodating space 8, which is located within the valve housing 1, contains a carrying unit 9, which carries a first and a second valve plate 10, 11. The valve plates 10, 11 are located in parallel planes, which run at right angles to the axes 4, 5 of the valve openings 2, 3. The valve plates 10, 11 serve for sealing the valve openings 2, 3 in the fully closed state of the vacuum valve.

The carrying unit 9 is fitted on a valve rod 12. In the exemplary embodiment shown, for this purpose, that end of the valve rod 12 which is located in the accommodating space 8 has fastened on it a connecting piece 64 (cf. FIG. 16), on which, for its part, is fastened the carrying unit 9, specifically the first carrier rod 19, which belongs to the carrying unit 9 and will be described hereinbelow. The valve rod 12 can be adjusted in the direction of its longitudinal axis by a valve-rod drive 13. The valve-rod drive 13 here is formed by two piston/cylinder units 14, 15, of which the cylinders or the piston rods are connected to the valve housing 1 and the piston rods or cylinders are connected to a yoke 16, which, for its part, is connected to a portion of the valve rod 12 which is located outside the valve housing 1, preferably to the end of the valve rod 12. The valve rod 12 is guided into the accommodating space 8 via a sealed linear lead-through.

By means of the valve-rod drive 13, which could also be designed in some other way, for example could also have just a single piston/cylinder unit, the valve plates 10, 11 are adjusted between their open positions, cf. FIGS. 12 and 13, in which the valve plates 10, 11 free the valve openings 2, 3, advantageously to the full extent, and their intermediate positions, cf. FIGS. 8 to 11, in which the valve plates 10, 11 cover over the valve openings 2, 3 (as seen in the direction of the axes 4, 5), but are raised up from the valve seats 6, 7.

In order to guide the carrying unit 9 in relation to the valve housing 1 so that the carrying unit 9 is guided in a centered manner in the valve housing 1 when the valve plates 10, 11 are being adjusted between their open positions and their intermediate positions, use is made of rollers 17 which are mounted in a rotatable manner on the carrying unit 9 and run in groove-like guide tracks 18, which are arranged on either side in the accommodating space 8 of the valve housing 1 and extend parallel to the valve rod 12. The converse arrangement (i.e. the rollers are mounted in a rotatable manner on the valve housing 1 and the groove-like guide tracks are arranged on the carrying unit 9) is also conceivable and possible in principle.

It would also be possible to provide two or more parallel valve rods 12, on which the carrying unit 9 is fitted.

The at least one valve rod 12 preferably extends at right angles to the axes 4, 5 of the valve openings 2, 3.

The valve plates 10, 11 and valve openings 2, 3 are of rectangular form and preferably have a length which is more than double the width. The length extents of the valve plates 10, 11 and valve openings 2, 3 here run at right angles to the valve rod 12 and at right angles to the axes 4, 5 of the valve openings 2, 3.

The carrying unit 9 has a first and a second carrier rod 19, 20. The carrier rods 19, 20, which are located parallel to one another, run at right angles to the axes 4, 5 of the valve openings 2, 3 and at right angles to the valve rod 12, i.e. they have longitudinal extents running at right angles to the axes 4, 5 of the valve openings 2, 3 and at right angles to the valve rod 12. The first and second carrier rods 19, 20 are spaced apart from one another, as seen in relation to the direction of the valve rod 12, and thus have an interspace 21 between them. This interspace is spanned by drive elements 22 and a guide element 23. The drive elements 22 and the guide element 23 are fastened, in the exemplary embodiment directly, in each case both on the first carrier rod 19 and on the second carrier rod 20. This forms a kind of self-supporting frame structure for the carrying unit 9. Instead of the drive elements 22 and the guide element 23 being fastened directly on the first and second carrier rods 19, it would also be possible for fastening to take place via at least one part located therebetween.

The drive elements 22 are located on a common straight line, which is located parallel to the first and second carrier rods 19, 20, and are spaced apart from one another along this straight line. The guide element 23 is likewise located on this straight line. As is also referred to hereinbelow, the guide element 23, in modified embodiments, could also be dispensed with or more than one guide element 23 could be present.

Between adjacent drive elements 22, the carrying unit 9 has free spaces, which pass all the way through the carrying unit 9. If at least one guide element 23, which will be described more precisely hereinbelow, is present, then free spaces of the carrying unit 9, which pass all the way through the carrying unit 9, are present between the guide element 23, or a respective guide element 23, and adjacent drive elements 22.

The drive elements 22 each comprise a cylinder 24 with first and second cylinder spaces 25, 26. A first piston 27, which is connected to the first valve plate 10, is arranged in the first cylinder space 25 and a second piston 28, which is connected to the second valve plate 11, is arranged in the second cylinder space. The pistons 27, 28 can be displaced in the cylinder spaces 25, 26 by means of compressed air fed through compressed-air lines 29, 30, which are formed by bores of the cylinders 24.

The cylinders 24 each comprise a cylinder body 31, which is open on its opposite sides directed towards the two valve plates 10, 11, which are to be fitted on the carrying unit 9, wherein the cylinder body 31 encloses the longitudinal axes of the first and second cylinder spaces 25, 26, said axes being located on a common straight line. Two cylinder covers 32 are connected in a sealed manner to the cylinder body 31 and close the latter off on opposite sides, with the exception of openings through which the piston rods 34, 35, extending from the pistons 27, 28, are guided in a sealed manner. The piston rods 34, 35 are located parallel to the axes 4, 5 of the valve openings 2, 3. An intermediate wall 36 of the cylinder body 31 separates off the cylinder spaces 25, 26 from one another. Guide stubs 37, 38 extend on either side from the intermediate wall 36 in the direction of the longitudinal axes of the cylinder spaces 25, 26, that is to say in the direction in which the pistons 27, 28 can be displaced, and these guide stubs project into central recesses 39, 40 of the pistons 27, 28 and piston rods 34, 35. This creates guidance for the pistons 27, 28 and piston rods 34, 35.

The lateral surfaces 41 of the cylinder bodies 31, said surfaces enclosing the cylinder spaces 25, 26, are provided, at opposite locations, with depressions 42, 43, through which the carrier rods 19, 20 run. In the region of these depressions 42, 43, the carrier rods 19, 20 are screwed to the cylinder bodies 31.

By means of the drive elements 22, the valve plates 10, 11 can be adjusted, parallel to the axes 4, 5 of the valve openings 2, 3, from their intermediate positions, cf. FIGS. 8 to 11, into their closed positions, cf. FIGS. 2 to 7, in which the valve plates 10, 11 are pushed onto the valve seats 6, 7, and the vacuum valve is thus closed. In the closed positions of the valve plates 10, 11, elastic sealing rings 10a, 11a of the valve plates 10, 11 are pushed onto sealing surfaces of the valve seats 6, 7. It would also be conceivable and possible for the sealing rings 10a, 11a to be arranged on the valve seats 6, 7 and for the sealing surfaces to be arranged on the valve plates 10, 11.

In order to displace the valve plates 10, 11 from their intermediate positions into their closed positions, the compressed-air line 30 is subjected to the action of compressed air (and air is expelled from the compressed-air line 29) and, in order to adjust the valve plates 10, 11 from their closed positions into their intermediate positions, the compressed-air line 29 is subjected to the action of compressed air (and air is expelled from the compressed-air line 30). Instead of a common compressed-air line 29 and/or 30, it would also be possible to provide a separate compressed-air line 29 and/or 30 for the two pistons 27, 28, wherein the pistons 27, 28 could be adjusted independently of one another.

The piston rods 34, 35 are connected to the valve plates 10, 11 via connecting devices. A respective connecting device comprises a connecting part 45, rigidly connected to the respective piston rod 34, 35, and a receiving part 46, 46', fitted on the respective valve plate 10, 11. A respective connecting part 45 is of mushroom-like form with a neck portion 47 and an enlarged head portion 48, which projects outwards in relation to the neck portion 47, as seen in relation to the longitudinal axis of the connecting part 45. A respective receiving part 46, 46' has a receiving slot 49. The neck portion 47 of the connecting part 45 of a respective connecting device can be pushed into the receiving slot 49 of the receiving part 46, 46' of the connecting device, in an introduction direction 50, as far as an end position. The slot width of the receiving slot 49 is smaller than the diameter of the head portion 48 of the connecting part 45, and therefore the head portion 48 cannot be pulled out of the receiving slot 49 in the direction of the longitudinal axis of the connecting part 45.

The receiving parts 46, 46' each have a depression on their side directed towards the respective valve plate 10, 11, on which they are fitted, and this depression forms a step-like widening of the receiving slot 49. This step-like widening of the receiving slot 49 contains the head portion 48 of the connecting part pushed into the receiving slot 49 by way of its neck portion 47. A respective receiving part 46, 46' together with the valve plate 10, 11, on which the receiving part 46, 46' is fitted, thus forms, overall, an undercut accommodating groove for a respective connecting part 45. The head portion 48 of the connecting part 45 pushed into the undercut accommodating groove is located, when the connecting part 45 is in the end position, in the undercut region of the accommodating groove. These accommodating grooves are designed, for example, in the form of T-shaped grooves, as is the case in the present exemplary embodiment.

Instead of the embodiment shown, it could also be provided that the receiving parts themselves are provided with undercut accommodating grooves. The longitudinal peripheries which delimit the accommodating groove on the surface of the respective receiving part then form the receiving slot which allows the neck portion of the connecting part to be retracted.

Of the receiving parts 46, 46', in the exemplary embodiment the two outer ones (as seen in relation to the longitudinal extent of the carrier rods 19, 20) can be rotated between an introduction position and a blocking position, to be precise in each case about an axis of rotation 80 which runs at right angles to the introduction direction 50 and is located parallel to the longitudinal axis of the connecting part 45, which is connected to this receiving part 46'. The axis of rotation 80 runs at right angles to the plane in which is located the valve plate 10, 11, which is connected to the carrying unit 9 by the connecting device. The rotatability of the receiving parts 46' is achieved, in the exemplary embodiment shown, by slots 51, 52 which run in circle-arc form around the longitudinal axis of the connecting part 45, which is connected to the receiving part 46', and have bolts 53, 54 (depicted only in FIGS. 27 and 28) passing through them, these bolts being screwed into the relevant valve plate 10, 11 through the slots 51, 52. Instead of direct rotatable mounting on the respective valve plate 10, 11, it would also be possible for the receiving parts 46' to be mounted in a rotatable manner on a respective bearing part which, for its part, is fastened on the respective valve plate 10, 11.

The rest of the receiving parts 46 are rigidly connected to the respective valve plate 10, 11, wherein the receiving slots 49 thereof are located parallel to one another and parallel to the receiving slots 49 of the receiving parts 46' located in their introduction positions. If the rotatable receiving parts 46' are located in their introduction positions, all the receiving slots 49 are open toward the same side, cf. FIGS. 27 and 28. The introduction direction 50 runs parallel to the receiving slots 49 of the receiving parts 46 and parallel to the receiving slots 49 of the receiving parts 46' located in their introduction positions. Via the open ends of the receiving slots 49, the neck portions 47 are introduced into the receiving slots 49 as far as end positions of the receiving parts 45 when a respective valve plate 10, 11 is being connected to the carrying unit 9, cf. FIGS. 29 and 30. It would also be possible, in principle, for the receiving slots 49 to have regions of enlarged width into which the head portions 48 can be introduced in the direction of the longitudinal axis of the connecting parts 45, that is to say at right angles to the longitudinal extent of the receiving slots 49, in order then to be displaced as far as the end positions in the longitudinal direction of the receiving slots 49.

In the end positions of the receiving parts 45, the rotatable receiving parts 46' are rotated from their introduction position into their blocking position, cf. FIGS. 31 to 33. In order to rotate a respective receiving part 46', use is made of an extension 55, which has engagement elements 56 for the engagement of a corresponding rotating tool. A respective receiving part 46' can be retained in its blocking position by frictional locking. It is also possible to provide additional securing parts, for example screws, for this purpose. In the exemplary embodiment, a rotatable receiving part 46' is rotated through 90° between its introduction position and its blocking position. Larger or smaller angles of rotation are also possible in principle.

It would also be conceivable and possible for all the receiving parts present to be designed such that they can be rotated about axes of rotation 80 which are located parallel to one another.

It would also be possible for the non-rotatable receiving parts 46 to be formed integrally with the respective valve plate 10, 11.

Figure 22:
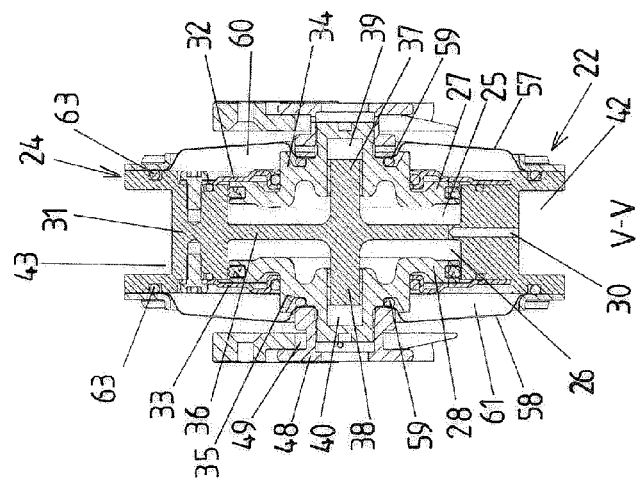
FIG. 22 shows a section along line VV from FIG. 20.
Figure 21:
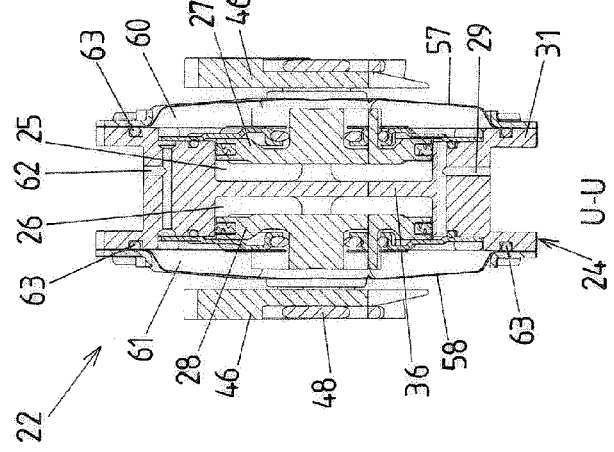
FIG. 21 shows a section along line UU from FIG. 20.
Figure 20:
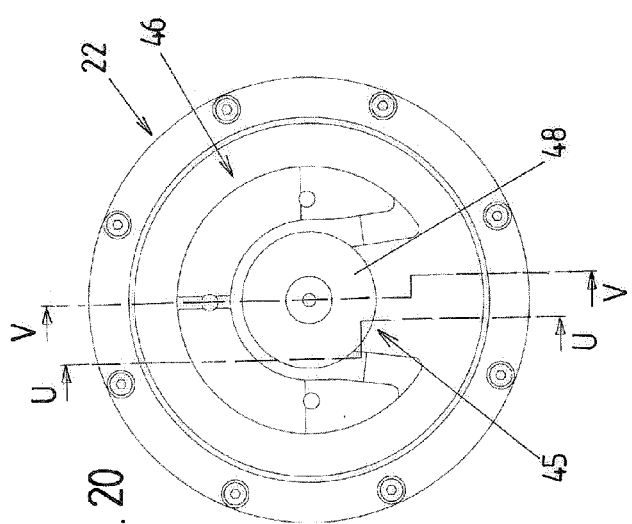
FIG. 20 shows a view of one of the drive elements with the connecting parts of the connecting devices.
Figure 26:
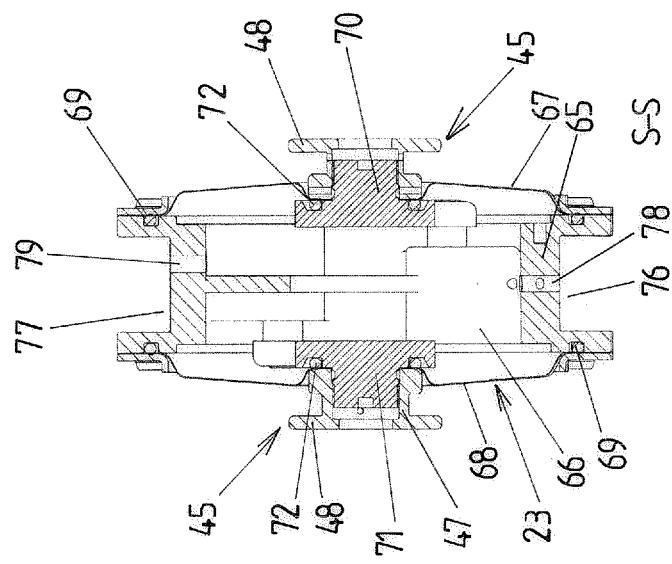
FIG. 26 shows a section along line SS from FIG. 25.
Figure 25:
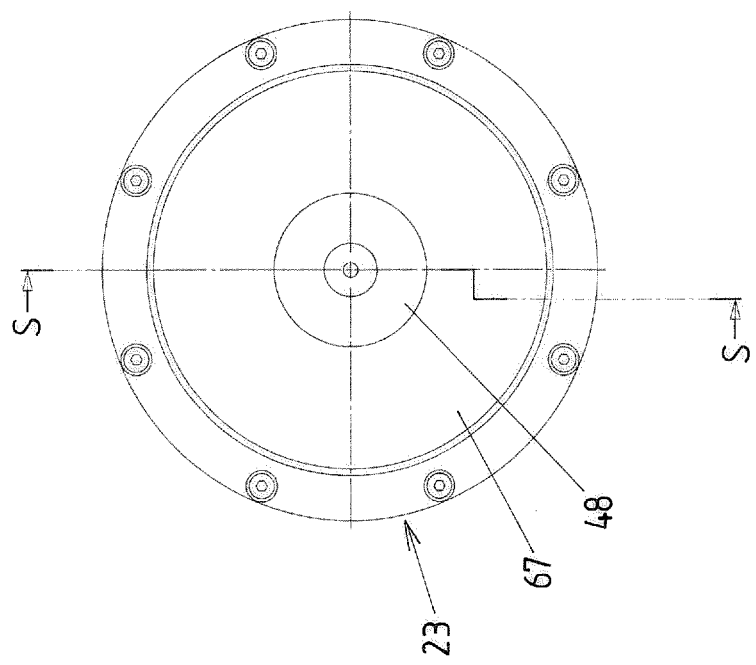
FIG. 25 shows a view of the guide element with the connecting parts and receiving parts of the connecting devices.

Flexible membranes 57, 58 are connected in a sealed manner to the cylinder bodies 31, on opposite sides, by means of elastic sealing rings 63, to be precise in the region of the outer circumference of the membranes 57, 58. The membranes 57, 58 each have a central opening, in the region of which they are connected in a sealed manner to the respective piston rod 34. For this purpose, in the exemplary embodiment, a respective membrane 57, 58 is pushed by the connecting part 45, which is connected to the respective piston rod 34, against an elastic sealing ring 59 (cf. FIG. 22), which is located between the membrane 57, 58 and the piston rod 34. The membranes 57, 58 thus separate off in each case a sealed intermediate volume 60, 61. The intermediate volumes 60, 61 are connected to the atmosphere via the line 62 (cf. FIG. 21). It would also be possible for the intermediate volumes 60, 61 to be evacuated (=pumped out) via the line 62. On account of the intermediate volumes 60, 61 being present, the cylinder spaces 25, 26 subjected to the action of compressed air need not be sealed directly in relation to the vacuum-valve vacuum region located in the accommodating space 8 of the valve housing 1.

The carrying unit 9 comprises, in addition, a guide element 23, which is arranged in a central region, as seen in relation to the longitudinal extents of the carrier rods 19, 20. The guide element 23 here spans the interspace 21 between the carrier rods 19, 20 and is secured both on the first carrier rod 19 and on the second carrier rod 20. It therefore likewise contributes to the frame structure of the carrying unit 9 and so to the overall stability of the carrying unit 9.

The guide element 23 comprises a housing 65, which is open on opposite sides toward the two valve plates 10, 11, which are to be fitted on the carrying unit 9. Flexible membranes 67, 68 are provided in order to seal the interior 66 of the housing toward these sides, and these membranes are connected in a sealed manner to the housing 65 in the region of their outer circumferential periphery by means of elastic sealing rings 69. The membranes 67, 68 have central openings, through which connection pieces 70, 71 are guided. In the region around their central openings, the membranes 67, 68 are connected in a sealed manner by means of sealing rings 72 located between the respective membrane 67, 68 and the respective connection piece 70, 71.

The connection pieces 70, 71 are connected to the valve plates 10, 11, to be precise likewise via the already described connecting devices. For this purpose, in the exemplary embodiment, the connecting parts 45 are fastened on the connection pieces 70, 71, wherein the membranes 67, 68 are pushed against the sealing rings 72 by the connecting parts 45. The connecting parts 45, which are secured on the connection pieces 70, 71, are each assigned a receiving part 46 fitted on the respective valve plate 10, 11. When the valve plates 10, 11 are being connected to the carrying unit 9, the neck portions 47 of the connecting parts 45, which are secured on the connection pieces 70, 71, are introduced into the receiving slots 49 of the receiving parts 46.

In the exemplary embodiment, these connecting devices have receiving parts 46 rigidly fitted on the respective valve plate 10, 11. It is also conceivable and possible to have exemplary embodiments in which one or more guide elements 23 are connected to the respective valve plate 10, 11 via connecting devices having receiving parts 46' which can be rotated between an introduction position and a blocking position.

A respective connection piece 70, 71 is rigidly connected to two guide rods 73, which are mounted in a displaceable manner in the interior 66 of the housing 65. For this purpose, the lateral surface of the housing 65 has inwardly projecting protrusions 74, which have guide bushings 75 which accommodate the guide rods 73. The guide rods 73 and guide bushings 75 are located parallel to the piston rods 34, 35 of the drive elements 22. The displaceable guidance of the guide rods 73 could also be realized in a manner other than that illustrated.

The four guide rods 73 which are present in the exemplary embodiment (two per valve plate 10, 11) are guided in a displaceable manner at locations which are spaced apart from one another in the circumferential direction of the housing 65.

The housing 65 has, on opposite sides, depressions 76, 77 in its lateral surface, which encloses the longitudinal axis of the interior 66. The carrier rods 19, 20 run through these depressions 76, 77 and, in the region of these depressions, the carrier rods 19, 20 are screwed to the housing 65.

The valve plates 10, 11, which are connected to the carrying unit 9, are guided in a displaceable manner by the guide element 23, to be precise in the direction of the movement of the valve plates between their respective intermediate position and their respective end position. It is also possible for the guide element 23 to absorb at least some of the weight of a respective valve plate 10, 11.

Air is expelled from the sealed interior 66 via the line 78, which opens out into this interior and is formed by a bore through the housing 65. It would also be possible, instead, for the interior 66 to be evacuated (=pumped out) via said line 78. The particles formed in the interior 66, in particular as a result of the movement of the sliding-guidance guide rods 73, thus do not pass into the vacuum region of the vacuum valve.

In addition to the centrally located guide element 23, as seen in relation to the longitudinal extent of the carrier rods 19, 20, or instead of this guide element, it would also be possible to provide one or more guide elements 23 which are designed in the manner described and are located outside the central region, as seen in relation to the longitudinal extent of the carrier rods 19, 20. A respective guide element 23 could also have guide rods 73 which are mounted in a more or less displaceable manner in the interior 66. It would also be possible to provide separate guide elements for the two valve plates 10, 11, of which in each case just one of the valve plates 10, 11 is guided in a displaceable manner. The connection pieces 70, 71 could also be dispensed with and the guide rods 73 could be connected directly to the connecting parts 45, or formed integrally therewith.

If the valve plates 10, 11 can be carried and guided in a sufficiently displaceable manner by the displaceable guides of the pistons 27, 28 and/or piston rods 34, 35 of the drive elements 22 alone, it is also possible to dispense with additional guide elements 23.

The connection between the carrying unit 9 and the valve plates 10, 11 via the connecting devices is such that thermal expansion of the valve plates 10, 11 can be sufficiently accommodated. Vacuum production processes may give rise to, possibly pronounced, heating of the valve plates 10, 11 with corresponding differences in temperature in relation to the carrying unit 9. In order to accommodate the thermal expansion of the valve plates 10, 11, the connecting devices have a sufficient amount of play in the direction of the longitudinal extent of the carrier rods 19, 20. It is possible here for one of the connecting devices, for example the centrally located connecting device, as seen in relation to the longitudinal extent of the carrier rods 19, 20, to be designed in an essentially play-free manner (e.g. having an amount of play of less than 0.5 mm, preferably less than 0.3 mm) as seen in relation to the direction of the longitudinal extent of the carrier rods 19, 20 and for the other connecting devices to have an amount of play, in both directions of the longitudinal extent of the carrier rods 19, 20, which increases (for example to more than 2 mm) as the distance from the essentially play-free connecting device increases. The difference in the amount of play, as seen in relation to the longitudinal extent of the carrier rods 19, 20, between the connecting device having the smallest amount of play and the connecting device having the largest amount of such play, these connecting devices being located at different locations of the longitudinal extent of the carrier rods 19, 20, is advantageously at least a factor of 5, it being possible, for example, for a difference in the region of a factor of 20 to be present.

If one of the valve plates 10, 11 is to be serviced, for example in order for the sealing ring 10a, 11a to be exchanged, then it is advantageously possible here for the other of the valve plates 10, 11 to remain in its closed position and to seal a vacuum chamber in which a vacuum prevails. It is possible here for the differential pressure present to retain this valve plate in the closed position if air is admitted to the accommodating space 8 and the vacuum chamber, which can be closed off by the other valve plate, and, in this state, to the compressed-air line 29. The guidance of the carrying unit 9 by the rollers 17 can allow, for this purpose, the carrying unit 9 to be displaced to a sufficient extent out of its central position, for example as a result of the elasticity of the rollers 17. It would also be conceivable to provide separate compressed-air lines 29 for the two pistons 27, 28, so that the pistons 27, 28 can be activated individually.

The compressed-air lines 29, 30 are connected to channels in the carrier rod 19 which are connected, via channels in the connecting piece 64, to channels in the valve rod 12, through which the compressed air can be fed (for the sake of simplicity, corresponding connections of compressed-air lines in a region of the valve rod 12 which is located outside the valve housing have been left out of the figures).

The line 78 is connected to a channel which is located in the carrier rod 19 and is connected, via a channel in the connecting piece 64, to a channel in the valve rod 12, which is connected to the exterior in a region of the valve rod which is located outside the valve housing, or which is connected to a pump-connected pumping-out line in that region of the valve rod 12 which is located outside the valve housing.

The interior 66 of the housing 65 is connected to a channel in the second carrier rod 20 via a line 79, which is formed by a bore in the housing 65, and this channel in the second carrier rod 20 is connected to the line 62. Air is admitted to the intermediate volumes 60, 61, or the latter are pumped out, in this way.

The accommodating space 8 of the valve housing 1 can be evacuated (=pumped out), and have air admitted to it, via a line which is not visible in the figures but can be formed by a bore leading through the valve housing 1 into the accommodating space 8. This can make it possible for it not to be necessary for the valve plates 10, 11 to be adjusted from their closed position into their intermediate position counter to a differential pressure in the order of magnitude of atmospheric pressure.

In the exemplary embodiment shown, in each case precisely one carrier rod 19, 20 is present on the opposite sides laterally alongside the piston rods of the drive elements 22, and therefore a total of precisely two carrier rods 19, 20 are present. It would also be conceivable and possible, in principle, for more than one carrier rod 19, 20 to be present at least on one side laterally alongside the piston rods or on either side laterally alongside the piston rods, wherein each carrier rod is advantageously rigidly connected to all the drive elements 22 and, if present, all the guide elements 23.

Various further modifications of the exemplary embodiment shown are possible without departing from the context of the invention. It would thus be possible for example for the connecting devices to be formed conversely, with the connecting parts 45 secured on the valve plates 10, 11 and the receiving parts 46, 46' connected to the piston rods 34, 35, or—at least the non-rotatable receiving parts 46—formed integrally therewith. It would also be possible for this converse arrangement to be provided just for some of the connecting devices. Such a converse arrangement could also be provided, in an analogous manner, for at least one securing element 23, if present.

Depending on the number of drive elements 22 present and of guide elements 23, if present, it is possible to provide more or fewer connecting devices in order to connect all the piston rods and all the guide rods, if present, to the valve plates 10, 11 (directly or via connection pieces 70). In the exemplary embodiment shown, the two outer connecting devices have the rotatable receiving parts 46'. Instead, or in addition, it would also be possible for at least one other of the drive elements 22 and/or of the guide elements 23, if present, to be connected to the respective valve plate 10, 11 via a connecting device of which the receiving part 46' can be rotated. It would also be possible here to provide, overall, just a single rotatable receiving part 46', which is assigned, for example, to the central guide element 23, or to a central drive element 22 provided instead, whereas all the other receiving parts 46 cannot be rotated. It is preferable, however, for at least two rotatable receiving parts 46' to be present.

Instead of the membranes 57, 58 and/or 67, 68, it would also be possible to provide rigid parts through which the piston rods 34, 35 and/or the connection pieces 70, 71 are guided in a sealed manner, for example, by means of a respective sealing ring, in the manner of a linear lead-through or, by means of a respective bellows, in the manner of a bellows lead-through.

A vacuum valve according to the invention could also have just a single valve plate, which is connected to the carrying unit via connecting devices. Adjustment of the at least one valve plate from the open position into the closed position could also take place in a manner other than that shown. It would thus be possible, for example, for the carrying unit itself to be designed without drive elements. Adjustment of the at least one valve plate between its intermediate position and its closed position could take place, for example, by means of push rods actuated by piston/cylinder units arranged on the valve housing. In other possible embodiments, the at least one valve rod, on which the carrying unit is fitted, could be displaced parallel or pivoted about a pivot axis in order to adjust the carrying unit and, with it, the at least one valve plate, which is fitted on the carrying unit.

LIST OF DESIGNATIONS

| | |
|---|---|
| 1 | Valve housing |
| 2 | First valve opening |
| 3 | Second valve opening |
| 4 | Axis |
| 5 | Axis |
| 6 | Valve seat |
| 7 | Valve seat |
| 8 | Accommodating space |
| 9 | Carrying unit |
| 10 | First valve plate |
| 10a | Sealing ring |
| 11 | Second valve plate |
| 11a | Sealing ring |
| 12 | Valve rod |
| 13 | Valve-rod drive |
| 14 | Piston/cylinder unit |
| 15 | Piston/cylinder unit |
| 16 | Yoke |
| 17 | Roller |
| 18 | Guide track |
| 19 | First carrier rod |
| 20 | Second carrier rod |
| 21 | Interspace |
| 22 | Drive element |
| 23 | Guide element |
| 24 | Cylinder |
| 25 | First cylinder space |
| 26 | Second cylinder space |
| 27 | First piston |
| 28 | Second piston |
| 29 | Compressed-air line |
| 30 | Compressed-air line |
| 31 | Cylinder body |
| 32 | Cylinder cover |
| 33 | Cylinder cover |
| 34 | Piston rod |
| 35 | Piston rod |
| 36 | Intermediate wall |
| 37 | Guide stub |
| 38 | Guide stub |
| 39 | Recess |
| 40 | Recess |
| 41 | Lateral surface |
| 42 | Depression |
| 43 | Depression |
| 45 | Connecting part |
| 46, 46' | Receiving part |
| 47 | Neck portion |
| 48 | Head portion |
| 49 | Receiving slot |
| 50 | Introduction direction |
| 51 | Slot |
| 52 | Slot |
| 53 | Bolt |
| 54 | Bolt |
| 55 | Extension |
| 56 | Engagement element |
| 57 | Membrane |
| 58 | Membrane |
| 59 | Sealing ring |
| 60 | Intermediate volume |
| 61 | Intermediate volume |
| 62 | Line |
| 63 | Sealing ring |
| 64 | Connecting piece |
| 65 | Housing |
| 66 | Interior |
| 67 | Membrane |
| 68 | Membrane |
| 69 | Sealing ring |
| 70 | Connection piece |
| 71 | Connection piece |
| 72 | Sealing ring |
| 73 | Guide rod |
| 74 | Protrusion |
| 75 | Guide bushing |
| 76 | Depression |
| 77 | Depression |
| 78 | Line |
| 79 | Line |
| 80 | Axis of rotation |

The invention claimed is:

1. A vacuum valve comprising:
a valve housing with at least one valve opening, which has an axis and is enclosed by a valve seat,
at least one valve plate, which is adjustable between an open position, in which the valve plate is free from the valve opening, and a closed position, in which the valve plate abuts against the valve seat, and
a carrying unit, which carries the at least one valve plate, the at least one valve plate is connected to the carrying unit via at least two connecting devices, each having a connecting part, with a neck portion and an enlarged head portion, which projects in relation to the neck portion, and having a receiving part, with a respective receiving slot into which the neck portion of the connecting part is introducable into an end position of the connecting part and which has a slot width which is smaller, at least in that region of the receiving slot in which the connecting part is located in the end position, than a diameter of the head portion of the connecting part, as measured in a direction of the slot width, wherein, in order to prevent the connecting parts from moving out of the receiving slots, at least one of the receiving parts is rotatable about an axis of rotation from an introduction position, in which the associated connecting part is introduced into the receiving slot, by way of the neck portion thereof, as far as the end position, into a blocking position.

2. The vacuum valve according to claim 1, wherein the at least one valve plate is connected to the carrying unit via two of the connecting devices and the receiving parts are each rotatable about a respective axis of rotation between the introduction position and the blocking position, and the axes of rotation are located parallel to one another.

3. The vacuum valve according to claim 1, wherein the connecting devices are spaced apart from one another in a direction of a longitudinal extent of the at least one valve plate.

4. The vacuum valve according to claim 1, wherein the at least one valve plate is connected to the carrying unit via at least three of the connecting devices.

5. The vacuum valve according to claim 4, wherein the receiving parts of outer ones of the connecting devices on either side, as seen in relation to a direction of a longitudinal extent of the at least one valve plate, are rotatable in each case about the axis of rotation between the introduction position and the blocking position.

6. The vacuum valve according to claim 1, wherein the at least one valve plate is adjustable from the open position into the closed position via an intermediate position, in which the at least one valve plate covers over the at least one valve opening, but is raised up from the valve seat.

7. The vacuum valve according to claim 6, wherein the carrying unit comprises drive elements by which the at least one valve plate is adjustable between the intermediate position and the closed position and which each comprise a cylinder, having at least one cylinder space, and at least one piston, which is arranged in the cylinder space and has a piston rod, wherein the piston rods are connected to the at least one valve plate via one of the connecting devices.

8. The vacuum valve according to claim 1, wherein the valve housing has first and second ones of the valve openings, the second valve opening having a second valve seat, the valve openings have parallel axes and are each enclosed by a respective ones of the valve seats, and the carrying unit carries first and second ones of the valve plates, which are adjustable in each case between the open position, in which the valve plates are free from the respective valve opening, and the closed position, in which the valve plates butt against the respective valve seats, and which are connected to the carrying unit in each case via at least of the two connecting devices.

9. The vacuum valve according to claim 8, wherein the carrying unit comprises drive elements by which the valve plates are adjustable, and has at least a first and a second carrier rod, to which cylinders of the drive elements are rigidly connected, wherein the cylinders each span an interspace located between the first and second carrier rods, which are arranged on opposite sides laterally alongside piston rods of the drive elements.

10. The vacuum valve according to claim 9, wherein the carrier rods have longitudinal extents running at right angles to the axes of the valve openings.

11. The vacuum valve according to claim 9, wherein the carrying unit is fitted on at least one valve rod, which can be adjusted by a valve-rod drive in a direction of a longitudinal axis of the valve rod for adjustment of the first and second valve plates between the open position and an intermediate position.

12. The vacuum valve according to claim 11, wherein the carrier rods have longitudinal extents running at right angles to the longitudinal extent of the at least one valve rod.

13. The vacuum valve according to claim 9, wherein, in order to connect the piston rods to the valve plates via the connecting devices, the connecting part of the respective connecting device is secured on the respective piston rod, or formed integrally therewith, and the associated receiving part of the respective connecting device is fitted on the respective valve plate, or formed integrally therewith.

14. The vacuum valve according to claim 9, wherein the carrying unit further includes at least one guide element, which comprises a housing and at least one guide rod, which is guided in a displaceable manner by the housing and is connected to the at least one valve plate, the guide element has a sealed interior which is delimited by the housing and by flexible membranes on opposite sides, as seen in relation to the direction of the axis of the at least one valve opening, and the at least one guide rod is mounted in a displaceable manner and is connected to the atmosphere, or evacuated, via a line.

15. The vacuum valve according to claim 14, wherein the housing is fastened on the first and second carrier rods and spans an interspace located between the first and the second carrier rods.

* * * * *